(12) United States Patent
Schüepp

(10) Patent No.: US 10,296,161 B2
(45) Date of Patent: May 21, 2019

(54) GENERATING A USER INTERFACE ON A DISPLAY

(75) Inventor: Michael Schüepp, Illnau (CH)

(73) Assignee: FERAG AG, Hinwil (CH)

( * ) Notice: Subject to any disclaimer, the term of this patent is extended or adjusted under 35 U.S.C. 154(b) by 1094 days.

(21) Appl. No.: 14/241,849

(22) PCT Filed: Aug. 22, 2012

(86) PCT No.: PCT/CH2012/000198
§ 371 (c)(1),
(2), (4) Date: Jun. 13, 2014

(87) PCT Pub. No.: WO2013/029190
PCT Pub. Date: Mar. 7, 2013

(65) Prior Publication Data
US 2014/0331151 A1 Nov. 6, 2014

(30) Foreign Application Priority Data

Aug. 31, 2011 (CH) ...................................... 1429/11

(51) Int. Cl.
*G06F 3/048* (2013.01)
*G06F 3/0481* (2013.01)
(Continued)

(52) U.S. Cl.
CPC ............ *G06F 3/0481* (2013.01); *G06F 9/451* (2018.02); *G06F 21/105* (2013.01); *G06F 21/62* (2013.01)

(58) Field of Classification Search
None
See application file for complete search history.

(56) References Cited

U.S. PATENT DOCUMENTS

| 6,313,854 B1 | 11/2001 | Gibson |
| 6,683,629 B1 | 1/2004 | Friskel et al. |

(Continued)

FOREIGN PATENT DOCUMENTS

| JP | 2009-31916 A | 2/2009 |
| JP | 2009-76052 A | 4/2009 |

(Continued)

OTHER PUBLICATIONS

Office Action issued in Japanese Patent Application No. 2014-527449, dated Feb. 23, 2016.

(Continued)

*Primary Examiner* — William C Trapanese
(74) *Attorney, Agent, or Firm* — Knobbe, Martens, Olson & Bear, LLP

(57) ABSTRACT

In order to generate a graphical user interface for a programme application on a display, multiple plug-ins for said programme application are registered in a plug-in catalogue. The plug-ins comprise a main window plug-in and multiple window area plug-ins. When the programme application is started, the main window plug-in is started, said plug-in representing a main window on the display and defining multiple sub-areas of the main window. The defined sub-areas of the main window are registered in an area manager. In addition, the window area plug-ins are started and each plug-in is registered in the area manager and linked by the area manager to one of the defined sub-areas of the main window. Each window area plug-in represents a window area on the display in the sub-area of the main window to which the plug-in is linked.

12 Claims, 8 Drawing Sheets

(51) Int. Cl.
*G06F 9/451* (2018.01)
*G06F 21/10* (2013.01)
*G06F 21/62* (2013.01)

(56) References Cited

U.S. PATENT DOCUMENTS

| | | | |
|---|---|---|---|
| 2006/0224992 A1 | 10/2006 | Rossi et al. | |
| 2007/0044086 A1* | 2/2007 | Sampath | G06F 8/20 717/168 |
| 2007/0130541 A1* | 6/2007 | Louch | G06F 3/04817 715/804 |
| 2007/0240128 A1 | 10/2007 | Patton | |
| 2008/0034314 A1* | 2/2008 | Louch | G06F 3/0481 715/778 |
| 2009/0031252 A1* | 1/2009 | Toda | G06F 9/4443 715/826 |
| 2010/0060909 A1 | 3/2010 | Conescu et al. | |
| 2011/0072376 A1 | 3/2011 | Moore et al. | |
| 2011/0107244 A1 | 5/2011 | Kinoshita et al. | |

FOREIGN PATENT DOCUMENTS

| | | |
|---|---|---|
| JP | 2009-253691 A | 10/2009 |
| JP | 2011-154473 A | 8/2011 |

OTHER PUBLICATIONS

English Translation of the International Search Report dated Oct. 26, 2012, International Application No. PCT/CH2012/000198 filed Aug. 22, 2012.

English Translation of the Written Opinion of the International Searching Authority, International Application No. PCT/CH2012/000198 dated Aug. 22, 2012.

English Translation of the International Preliminary Report on Patentability dated Mar. 4, 2014, International Application No. PCT/CH2012/000198 filed Aug. 22, 2012.

* cited by examiner

GENERATING A USER INTERFACE ON A DISPLAY

BACKGROUND

This application is the U.S. National Phase under 35 U.S.C § 371 of International Application No. PCT/CH2012/000198, filed Aug. 22, 2012, which claims priority To Swiss Application No. 01429/11, filed Aug. 31, 2011.

Field of the Invention

The present invention relates to a device and to a method for generating a user interface on a display. The present invention relates in particular to a device and to a computer-implemented method for generating a graphical user interface for a program application on a display.

Description of the Related Art

In known systems and methods for generating graphical user interfaces on displays, window areas of the user interface are defined directly in the corresponding program application or they are read in a predefined form from a configuration file. The configuration contains various window types which are predefined and hard coded by the application and whose position and appearance can be influenced via the configuration. However, it is not possible to add new windows. If programmed extension modules are added dynamically during runtime, then they are arranged either in detached, completely free "flying" windows, or are bound to a window predefined by the application. However, a dynamic integration of windows in the user interface, which is locally and in terms of appearance flexible, is not possible.

SUMMARY

The problem of the present invention is to propose a device and a method for generating graphical user interfaces on a display, which do not have at least some of the disadvantages of the known systems and methods. In particular, one problem of the present invention is to propose a device and a method for generating a graphical user interface on a display, which allow a dynamic integration of windows in the user interface, which is locally and in terms of appearance flexible.

According to the present invention, these aims are achieved by the features of the independent claims. Additional advantageous embodiments also can be obtained from the dependent claims and the description.

The above-mentioned aims are achieved by the present invention in particular in that, for generating a graphical user interface for a program application on a display, multiple plug-ins for the program application are registered in a plug-in catalog, wherein the plug-ins comprise a main window plug-in and multiple window area plug-ins. When the program application is started, the main window plug-in is started, which represents a main window on the display and defines multiple sub-areas of the main window. The defined sub-areas of the main window are registered in an area manager. The window area plug-ins are started. The window area plug-ins are registered in each case in the area manager and they are linked by the area manager in each case to one of the defined sub-areas of the main window. The window area plug-ins in each case represent on the display a window area in that sub-area of the main window to which they are linked.

In an embodiment variant, in the plug-in catalog, one or more widget plug-ins and a widget manager plug-in are registered in addition. When the program application is started, the widget manager plug-in is started in addition, which determines widget contexts which are each assigned to one of the window area plug-ins. The widget plug-ins are started and they generate in each case interface input elements and/or interface output elements, and they insert said elements on the display in that window area to which they are linked by the determined widget contexts.

In an additional embodiment variant, in the plug-in catalog, a login plug-in is registered in addition. When the program application is started, the login plug-in is started in addition, which receives identification data and access data from the user. On the basis of the identification data and access data, user-specific stored widget configurations are determined. The user-specific widget configurations are applied to the widget contexts assigned to the window area plug-ins.

In an embodiment variant, before starting the plug-ins, a plug-in-specific license check is carried out in each case, and the start of a plug-in is prevented in the case of insufficient license or absence of a license.

In an additional embodiment, the plug-ins are filtered in a language-specific manner before they are started, and the start of language-specific plug-ins is geared toward a defined target language.

In addition to the computer-implemented method, the present invention also relates to a computer system for generating a graphical user interface for a program application on a display and to a computer program product for controlling the computer system. Advantageously, the computer program product comprises a computer-readable medium with computer program code stored thereon for controlling one or more processors of the computer system, so that the computer system carries out the method for generating a graphical user interface for a program application on a display.

BRIEF DESCRIPTION OF THE DRAWINGS

Below, an embodiment of the present invention is described in reference to an example. An example of the embodiment is illustrated in the following appended figures.

DETAILED DESCRIPTION

Figure 1:
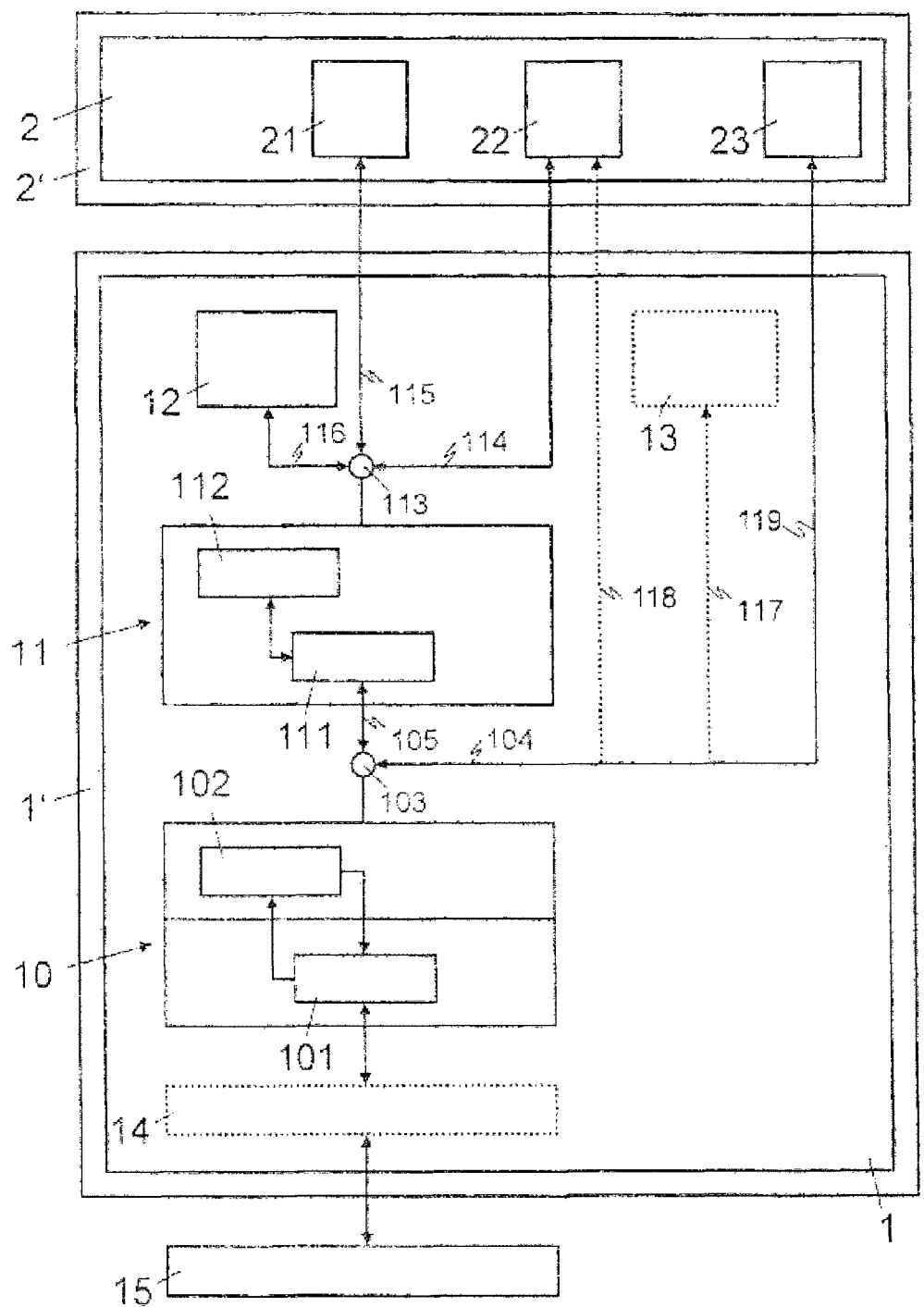
FIG. 1: shows a block diagram which diagrammatically illustrates a computerized machine control system which comprises an application-independent, machine-specific part and a machine-independent, application-specific part, in order to access data points of a machine.
Figure 2:
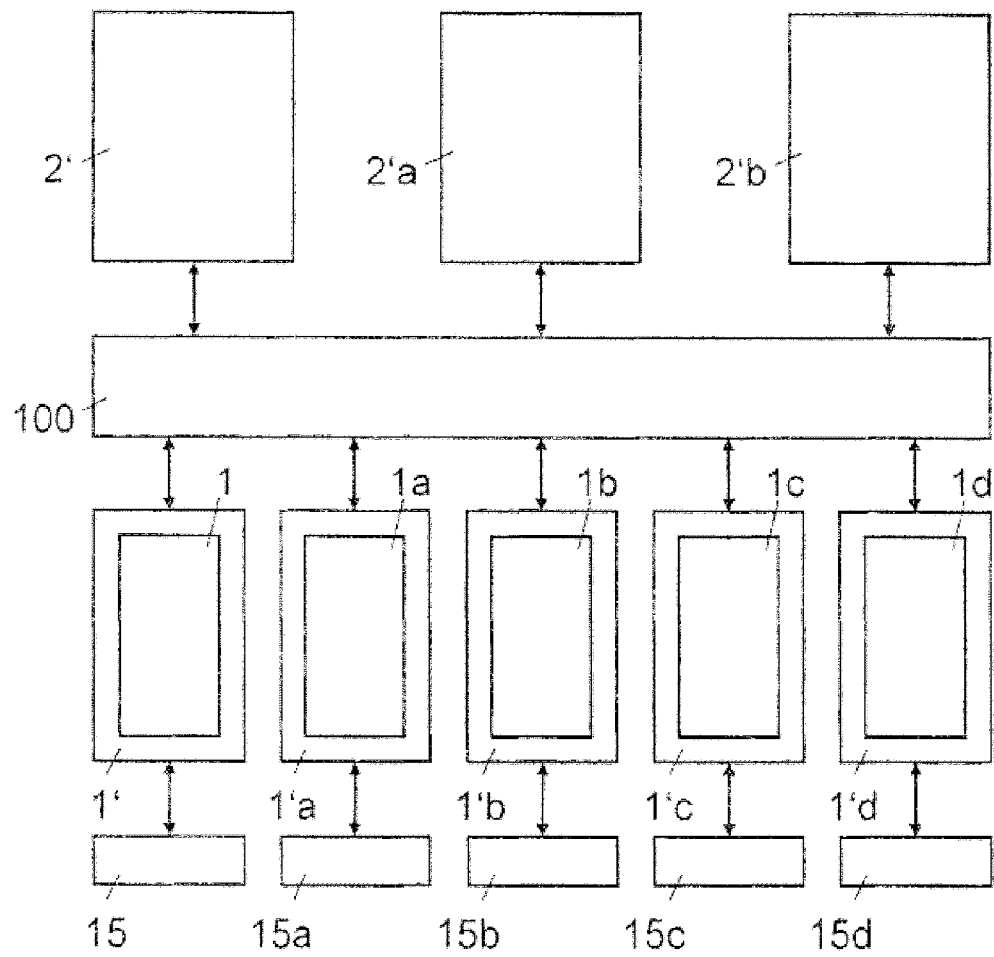
FIG. 2: shows a block diagram which diagrammatically illustrates several computerized machine control systems and higher-level management and operating systems which are connected in a communication-enabled manner to each other via a service-oriented architecture platform.
Figure 3:
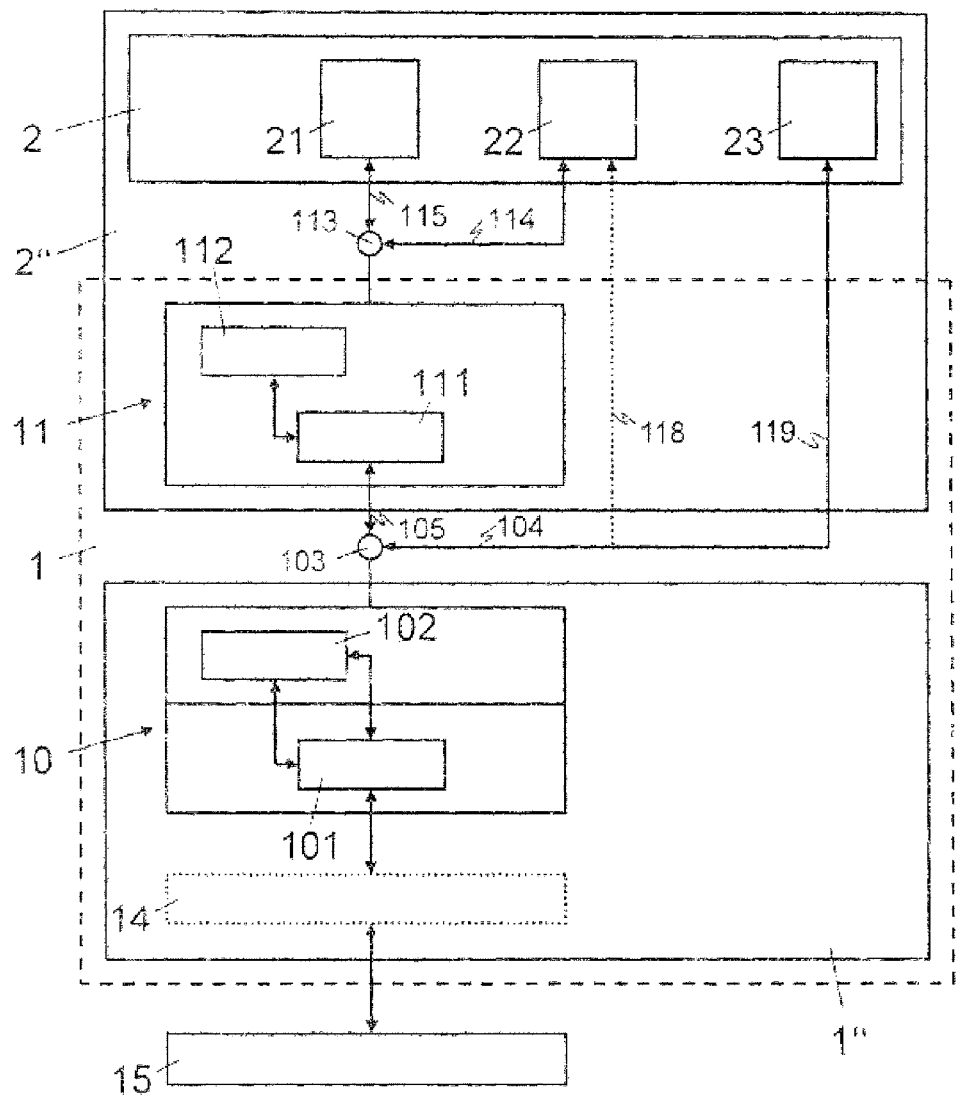
FIG. 3: shows a block diagram which diagrammatically illustrates a computerized machine control system in which, for accessing data points of a machine, an application-independent, machine-specific part and a machine-independent, application-specific part are implemented on different computer systems and connected in a communication-enabled manner to each other via a service-oriented architecture platform.

In FIGS. 1, 2 and 3, reference numeral 1 refers to a computerized machine control system for controlling machines 15, for example, printers, printed product processing machines, conveyance machines, etc. The control of the machine 15 occurs via a programmable device, for example, via a so-called Programmable Logic Controller (PLC) 14, which is connected (electrically) to sensors and actors of the machine 15. Depending on the embodiment variant, the programmable device 15 is connected directly or via a microcontroller of the machine 15 to the machine 15 or its sensors and actors.

In FIGS. 1 and 3, the reference numeral 2 relates to a computerized management or operating system. The management or operating system 2 is implemented on an operative computer system 2' with one or more processors which are connected to one or more displays, for example, to touch sensitive displays, in particular so-called multitouch displays.

As shown diagrammatically in FIGS. 1 and 3, the management or operating system 2 comprises several functional modules, for example, a user interface 21 for configuring, monitoring and operating the production of one or more machines 15, 15*a*, 15*b*, 15*c*, 15*d*; a user interface 23 for maintaining and diagnosing one or more machines 15, 15*a*, 15*b*, 15*c*, 15*d*; and a service module 22 with several higher-level services, so-called high level services, such as, for example, commands for starting, stopping or interrupting the production, which are accessible to and executable by service consumers, such as the user interfaces 21, 23. As described in greater detail below, the user interfaces 21, 23 are preferably based on so-called plug-ins and they comprise several selectable and activatable widget plug-ins. The service module 22 is preferably implemented as a plug-in and a service of a service-oriented architecture platform 100, for example, the Windows Communication Foundation (WCF) in .Net of Microsoft Corporation.

As shown in FIGS. 1 and 3, the machine control system 1 comprises functional modules, which are subdivided into an application-independent, machine-specific part 10 and a machine-independent, application-specific part 11. Depending on the embodiment variant and/or configuration, the functional modules of the machine control system 1 comprise in addition a user interface 12 for configuring, monitoring and operating the production of one or more machines 15, 15*a*, 15*b*, 15*c*, 15*d* and/or a user interface 13 for maintaining and diagnosing one or more machines 15, 15*a*, 15*b*, 15*c*, 15*d*. The user interfaces 12, 13 are preferably based on so-called plug-ins and they comprise several selectable and activatable widget plug-ins, as described below in greater detail.

In the embodiment variant according to FIG. 1, the machine-specific part 10 and the application-specific part 11 are implemented on the same operative computer system 1', for example, on one or more separate processors which are connected to the PLC 14, or on one or more processors of the PLC 14. The computer system 1' with the machine control system 1 is implemented as part of the machine 15, attached directly to the machine 15 or arranged separately and at a distance therefrom. The computer system 1' is implemented as a so-called embedded PC, for example.

In the embodiment variant according to FIG. 3, the machine-specific part 10 and the application-specific part 11 are implemented on different computer systems 1", 2". Here, the machine-specific part 10 is implemented on the computer system 1", for example, on one or more separate processors which are connected to the PLC 14, or on one or more processors of the PLC 14. The computer system 1" with the machine-specific part 10 is implemented as part of the machine 15, connected directly to the machine 15 or arranged separately and at a distance therefrom. The application-specific part 11, on the other hand, is implemented on the computer system 2" of the management or operating system 2.

The machine-specific part 10 comprises a control module 101 and a machine-specific domain model 102. The control module 101 is arranged so as to access, via a machine-specific communication protocol, for example, TCP/IP, Profibus, or ADS (Automation Device Specification) from the company Beckhoff, the data points of the machine 15, in order to read or write the current value of one or more data points.

Here, a data point is a value that is output by the machine 15, for example, a measurement or counter value of a sensor or counter of the machine 15, or that is input into the machine 15, for example, a control command, control parameter or control value. Data points comprise in particular also (current) status values and status information of the machine 15. A data point represents the input or output of values of the machine 15, in particular via a processor of the machine 15. The machine-specific domain model 102 comprises machine-specific data point objects. Here, the machine-specific data point objects are data objects, which map one or more data points of the machine 15. When the control module 101 accesses via the PLC 14 the data points of the machine 15, the machine-specific communication protocol is geared specifically toward the corresponding PLC 14, and the machine-specific domain model 102 comprises exclusively data point objects that are accessible via the PLC 14. The reading process occurs periodically and in addition on the basis of an explicit read command. Current values of read data points are written by the control module 101 into a corresponding data point object of the machine-specific domain model 102. The writing process occurs as a rule on the basis of an explicit write or service command to the machine-specific domain model 102. Here, the current value of the corresponding data point object in the machine-specific domain model 102 is written by the control module 101 into the corresponding data point of the machine 15 or of the PLC 14. Here, it should be noted that a data point— and correspondingly also a data point object can comprise several data values, for example, a table or matrix of data values, which are arranged in a (structured) file.

In an embodiment variant, the control module 101 stores the data points acquired directly by the machine 15 or via the PLC 14 in a buffer memory and updates the corresponding data point objects in the machine-specific domain model 102 only when all or at least a defined portion of the data points are in a consistent status, that is to say none of the corresponding data points has a value of an old status or of an unstable intermediate status. Thus, snapshots with current and status-consistent data points of the machine 15 or of defined parts of the machine 15 are generated.

In a further variant, the control module 101 periodically checks whether the machine 15 or the PLC 14 is available, i.e., connected, operative and accessible. For this purpose, the control module 101 periodically sends corresponding query messages to the machine 15 or the PLC 14. If no return message is received by the machine 15 or the PLC 14 within a defined duration in the control module 101, the control module 101 sets a status assigned to the machine-specific domain model 102 to a value which indicates that the domain model 102 is not connected to the machine 15.

The application-specific part 11 comprises an application-specific domain model 112 and a mapping module 111. The application-specific domain model 112 comprises application-specific data objects. The mapping module 111 is arranged to access the machine-specific domain model 102 via the corresponding service 103 of the service-oriented architecture platform 100. In a writing function, application-specific data objects are mapped to machine-specific data point objects; in the process the mapping module 111 writes current values of application-specific data objects into associated data point objects of the machine-specific domain model 102. In a reading function, machine-specific data point objects are mapped to application-specific data objects; in the process the mapping module 111 reads current values of one or more machine-specific data point objects and writes them into associated data objects of the application-specific domain model 112. Both the reading process and also the writing process occur exclusively on the basis of explicit write, read or service commands to the application-specific domain model 112.

The machine-specific domain model 102 and the application-specific domain model 112 are preferably implemented as available services 103 or 113 of the service-oriented architecture platform 100, for example, WCF. Here, the available functions, for example, writing or reading, and data point objects or application-specific data objects of the domain models 102, 112 are defined and retrievable via an interface of the service-oriented architecture platform 100, which is accessible to service consumers. The defined services 103, 113 are accessible to service consumers via the service-oriented architecture platform 100, as indicated diagrammatically in FIGS. 1 and 3 by the arrows 104 and 105 or 114, 115 and 116. The domain models 102, 112 deliver to their service consumers machine-specific data point objects or application-specific data objects only upon request, i.e., when the service consumer accesses the corresponding service 103, 113 and requests the corresponding data point object or data object. For example, the application-specific part 11 receives data point objects from the machine-specific domain model 102 only when said part explicitly requests said objects via the corresponding service 103, and the user interfaces 12, 13, 21 and the service module 22 receive from the application-specific part 11 data objects from the application-specific domain model 112 only when they request said data objects explicitly via the corresponding service 113.

As indicated diagrammatically with the arrows 117, 118 and 119, in a variant the service module 22 and the user interfaces 23 and 13 are arranged so as to access the machine-specific domain model 102 directly via the service 103. For this purpose, machine-specific adaptations of service module 22 and user interfaces 23, 13 are required.

For the data exchange, the computer systems 1', 1", 2', 2" are connected via a communication connection, for example, via a data bus or a local network (LAN). The communication among the functional modules, which are implemented as services of the service-oriented architecture platform 100, occurs preferably via communication functions of the service-oriented architecture platform 100, for example, WCF, which are available, for example, as part of a run-time environment of the service-oriented architecture platform 100. In order to prevent connections between services of the service-oriented architecture platform 100 from being terminated due to inactivity within a defined duration (timeout), the functional modules implemented as services are arranged so as to transfer periodic hold-active calls to those services of which they are service consumers, or to receive periodic hold-active calls from their service consumers and directly respond with a hold-active response.

FIG. 2 illustrates an installation with several machines 15, 15*a*, 15*b*, 15*c*, 15*d*, each controlled by a machine control system 1, 1*a*, 1*b*, 1*c*, 1*d*, whose functional modules, as illustrated in FIG. 1, are implemented on a common computer system 1', 1'*a*, 1'*b*, 1'*c*, 1'*d*. As can be seen in FIG. 2, the management or operating system 2 is implemented on several operative computer systems 2', 2'*a*, 2'*b*, and it comprises several mutually complementary and/or redundant program applications (application). As diagrammatically illustrated in FIG. 2, the functional modules of the machine control systems 1, 1*a*, 1*b*, 1*c*, 1*d* and of the management or operating system 2, which are implemented on the computer systems 1', 1'*a*, 1'*b*, 1'*c*, 1'*d*, 2', 2'*a*, 2'*b*, communicate and interact via the service-oriented architecture platform 100, for example, WCF, and its communication functions.

Figure 4:
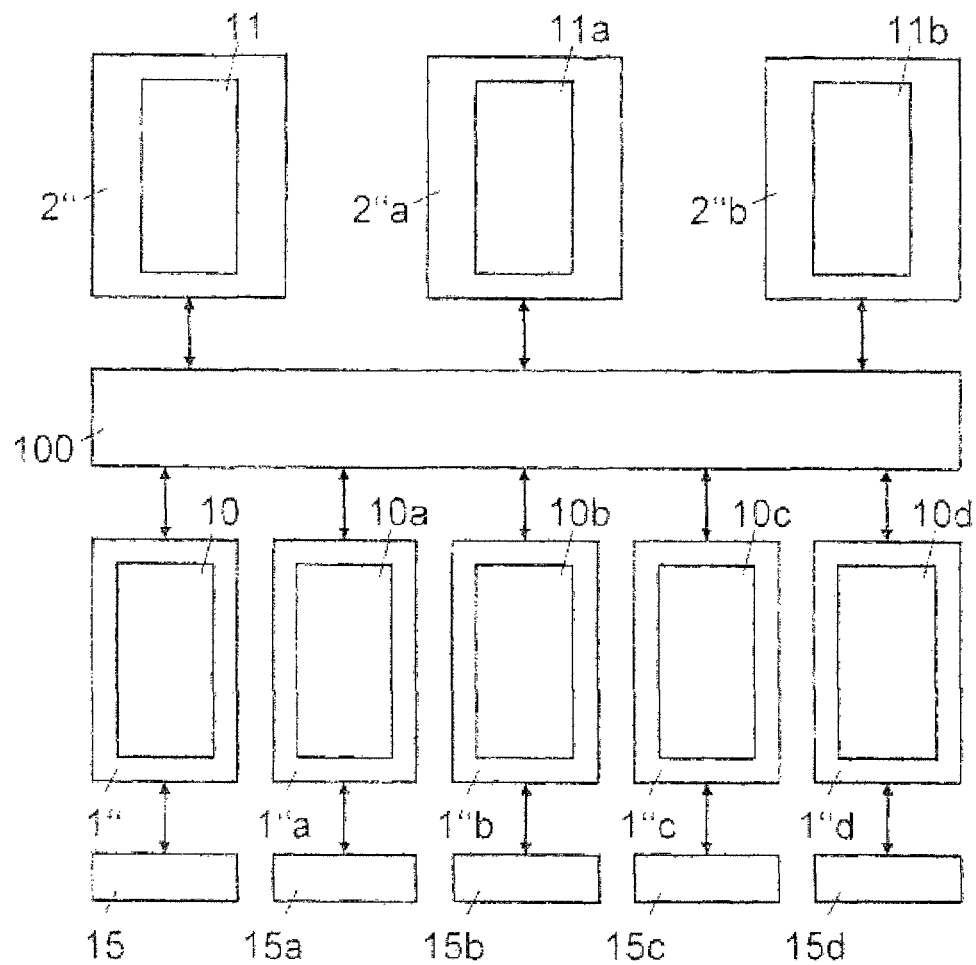
FIG. 4: shows a block diagram which diagrammatically illustrates several computerized machine control systems and higher-level management and operating systems, in which the application-independent, machine-specific parts and the machine-independent, application-specific parts are implemented on different computer systems and connected in a communication-enabled manner to each other via a service-oriented architecture platform.

FIG. 4 illustrates an installation with several machines 15, 15*a*, 15*b*, 15*c*, 15*d*, each of which is controlled by a machine control system 1, whose functional modules, as illustrated in FIG. 3, are each implemented on different computer systems. The machine-specific parts 10, 10*a*, 10*b*, 10*c*, 10*d* are each implemented on the computer system 1", 1"*a*, 1"*b*, 1"*d* connected to the corresponding machine 15, 15*a*, 15*b*, 15*c*, 15*d*. The application-specific parts 11, 11*a*, 11*b*, on the other hand, are implemented on the computer systems 2", 2"*a*, 2"*b* of the management or operating system 2, which comprises several mutually complementary and/or redundant program applications. As illustrated diagrammatically in FIG. 4, the functional modules of the machine-specific parts 10, 10*a*, 10*b*, 10*c*, 10*d*, of the application-specific parts 11, 11*a*, 11*b* and of the management or operating system 2, modules which are implemented on the computer systems 1", 1"*a*, 1"*b*, 1"*c*, 1"*d*, 2", 2"*a*, 2"*b*, communicate and interact via the service-oriented architecture platform 100, for example, WCF, and via its communication functions.

Figure 5:
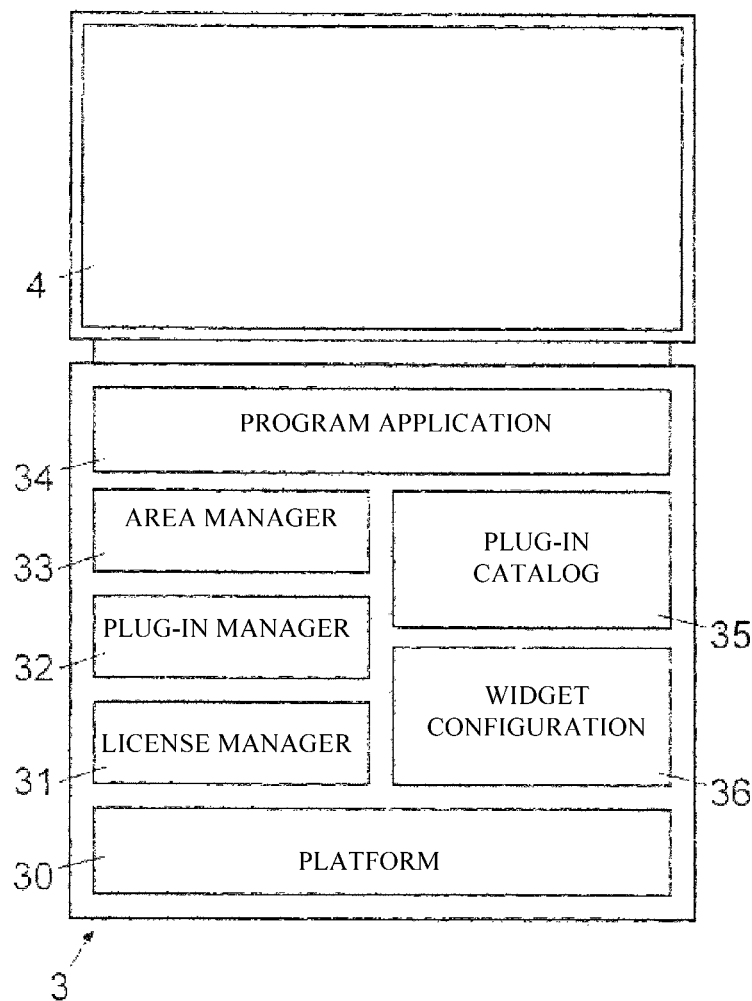
FIG. 5: shows a block diagram of a computer system for generating a graphical user interface on a display.

In FIG. 5, reference numeral 3 refers to a computer system with one or more operative computers and in each case one or more processors, which are connected to one or more displays 4, for example, touch-sensitive displays, in particular so-called multitouch displays. The computer system 4 comprises, for example, one or more of the above-described computer systems 1', 1'*a*, 1'*b*, 1'*c*, 1'*d*, 1", 1"*a*, 1"*b*, 1"*c*, 1"*d*, 2', 2'*a*, 2'*b*, 2", 2"*a* and/or 2"*b*.

As represented diagrammatically in FIG. 5, the computer system 3 comprises several functional modules, in particular a platform 30, a license manager 31, a plug-in manager 32, an area manager 33, at least one program application 34, a plug-in catalog 35, and stored (user-specific) widget configurations 36. The widget configurations 36 define the views, and the data contents of a widget to be displayed, which are to be used for a certain user. For example, widget configurations 36 are defined at the beginning in a user base configuration and later determined and stored in each case at the time of the shut down of the application and/or logout of the user on the basis of the current views and displayed data contents of the widgets.

The platform 30 comprises several components, in particular components of a run-time environment for supporting a service-oriented architecture platform, a dynamic application extension and graphic functions, for example, .NET components of Microsoft Corp. for WCF, MEF (Managed Extensibility Framework), and WPF (Windows Presentation Foundation).

The plug-in catalog 35 is implemented, for example, in MEF, and it comprises several plug-ins or references to stored plug-ins. Plug-ins are software components (computer programs), which extend an existing software-based program application, so that the program application is extended with the functions provided by the plug-in. The plug-ins are loadable and executable dynamically, for example, at the start up or during the runtime of a program application (application), as a complement to the program application. The plug-in catalog 35 comprises, in particular, a main window plug-in, several window area plug-ins, a login plug-in, a widget manager plug-in, and several widget plug-ins.

In the following sections, in reference to FIG. 6, as an example, a sequence of steps for generating a graphical user interface 6 for a program application 34 of a display 4 is described.

In step S1, loadable stored plug-ins or references to these plug-ins are loaded in the plug-in catalog 35, for example, via MEF. Step S1 is executed, for example, as a preparatory step as part of a system configuration. Each plug-in is provided with different attributes. These plug-in attributes define at least startup requirements and startup restrictions and they comprise in particular also language attributes and license attributes.

In step S2, the plug-ins in the plug-in catalog 35 are filtered on the basis of their attributes after the program application 34 has been started. Here, the license manager 31 checks for each plug-in whether a valid license exists. In addition, the language to be used in the case of plug-ins with interface functions for the interaction with a user is checked.

In step S3, the plug-in manager 32 starts the plug-ins in accordance with their start requirements and start restrictions in the required, for example, user-specific, language, if a sufficient license for that purpose exists. The plug-ins are started via MEF, for example.

Figure 7A:
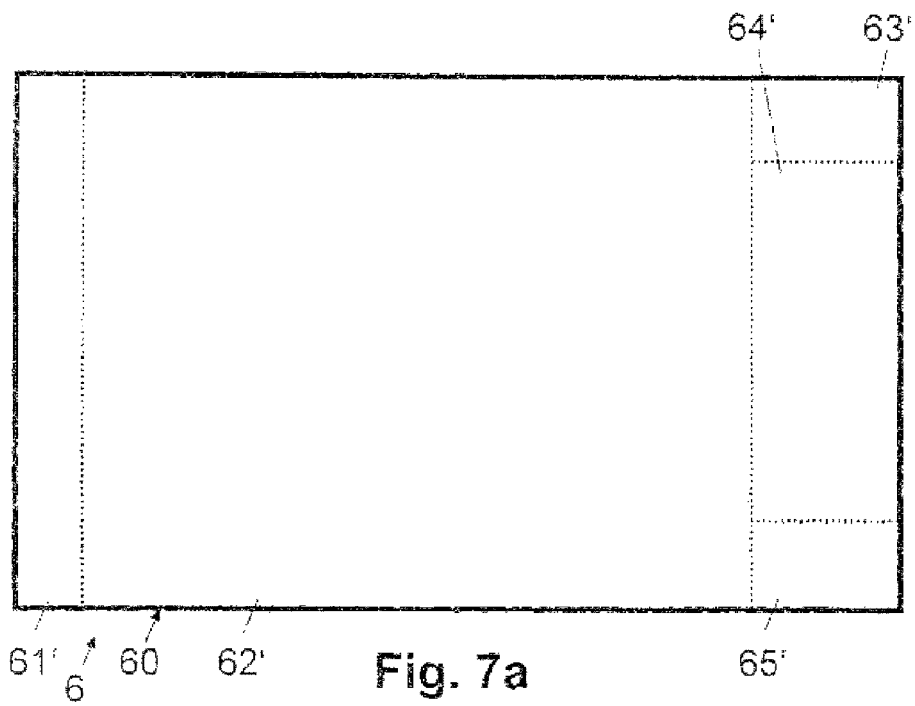
FIG. 7*a*: shows an example of a main window represented on a display.

In step S31, the main window plug-in is started. As indicated with reference numeral S35, the main window plug-in on the display 4 represents a main window and it defines several sub-areas in the main window. As shown in FIG. 7*a*, the main window 60 is substantially merely a frame (shell) represented on the display 4, for which several sub-areas 61', 62', 63', 64', 65', which are not visible on the display 4, are defined. The sub-areas 61', 62', 63', 64', 65' are defined by the main window plug-in, for example, in WPF.

In step S32, the window area plug-ins are started additionally. As indicated with reference numeral S36, the main window plug-ins are registered in each case in the area manager 33.

In step S33, the widget manager plug-in is started. As indicated with reference numeral S37, the widget manager plug-in imports widget contexts, which are stored associated in each case with the window area plug-ins, for example, via MEF. The widget contexts define possible, permissible widgets, which can be inserted, for example, in an associated window area.

In step S34, the login plug-in is started. As indicated with reference numeral S38, the login plug-in is registered in the area manager 33.

Figure 6:
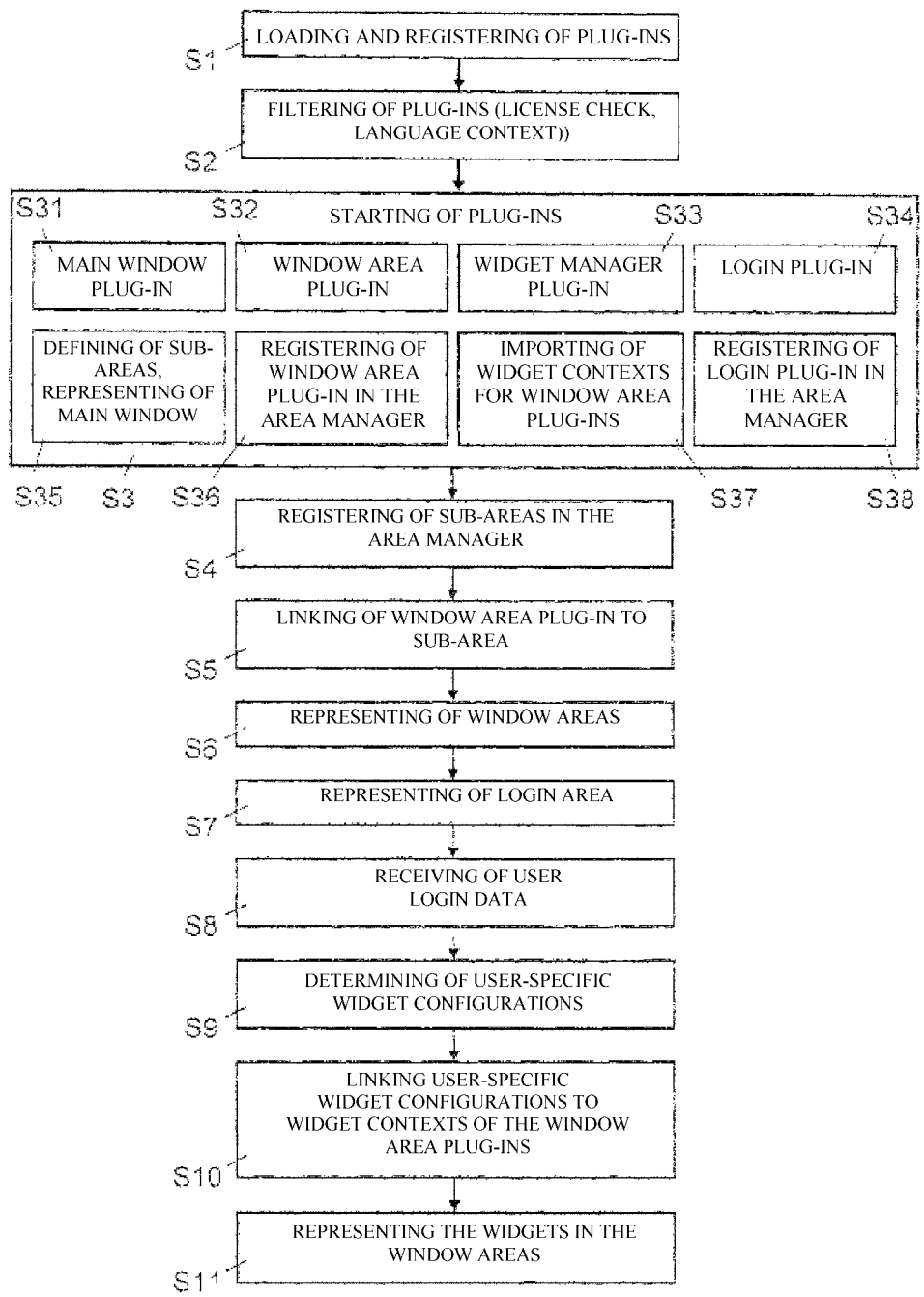
FIG. 6: shows a flow chart which diagrammatically illustrates an example of a sequence of steps for generating a graphical user interface on a display.

In FIG. 6, in connection with step S3, only a selection of plug-ins is displayed, which are started, and which are of particular interest in connection with the generation of the graphical user interface 6. The person skilled in the art will understand, however, that additional plug-ins are also started, for example, the widget plug-ins.

In step S4, the sub-areas 61', 62', 63', 64', 65' defined in WPF, for example, are reported (registered) in the area manager 33, for example, by WPF, which in addition initializes all defined sub-areas 61', 62', 63', 64', 65'.

In step S5, the area manager 33 links the reported (registered) sub-areas 61', 62', 63', 64', 65' to the window area plug-ins, which are each provided for the sub-areas 61', 62', 63', 64', 65'. Here, the login plug-in in particular is also linked to the sub-area 63' provided for that purpose.

Figure 7B:
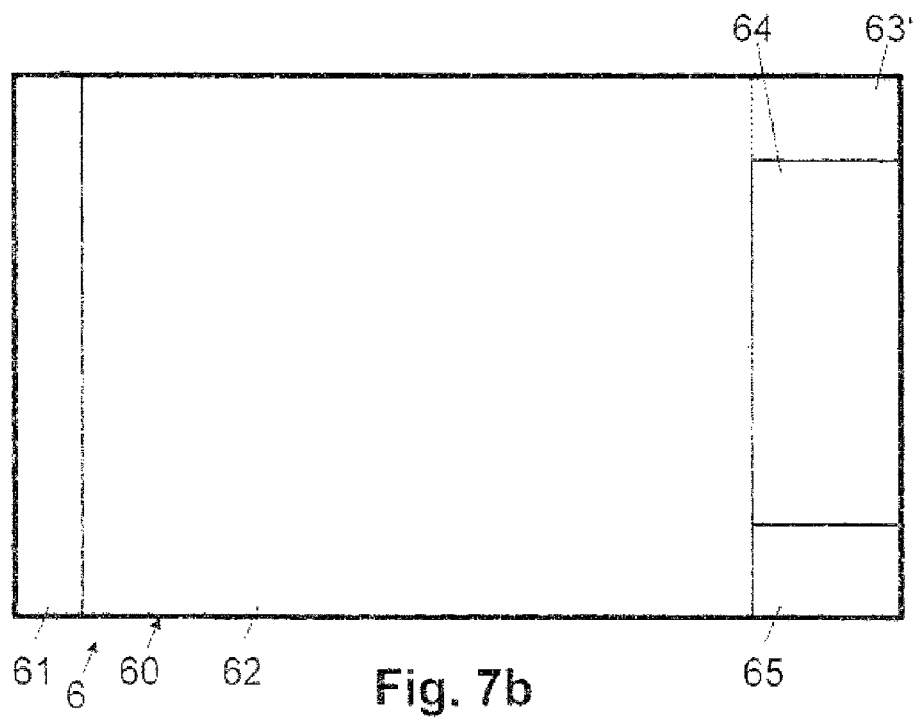
FIG. 7*b*: shows an example of several window areas of the main window, which are represented on the display.

In step S6, the window area plug-ins on the display 4 represent their window area in each case in the sub-area 61', 62', 64', 65' of the main window 60 to which they are linked. As shown in FIG. 7*b*, on the display 4, the window areas 61, 62, 64, 65 are now visibly represented in the main window 60 of the user interface 6.

Figure 7C:
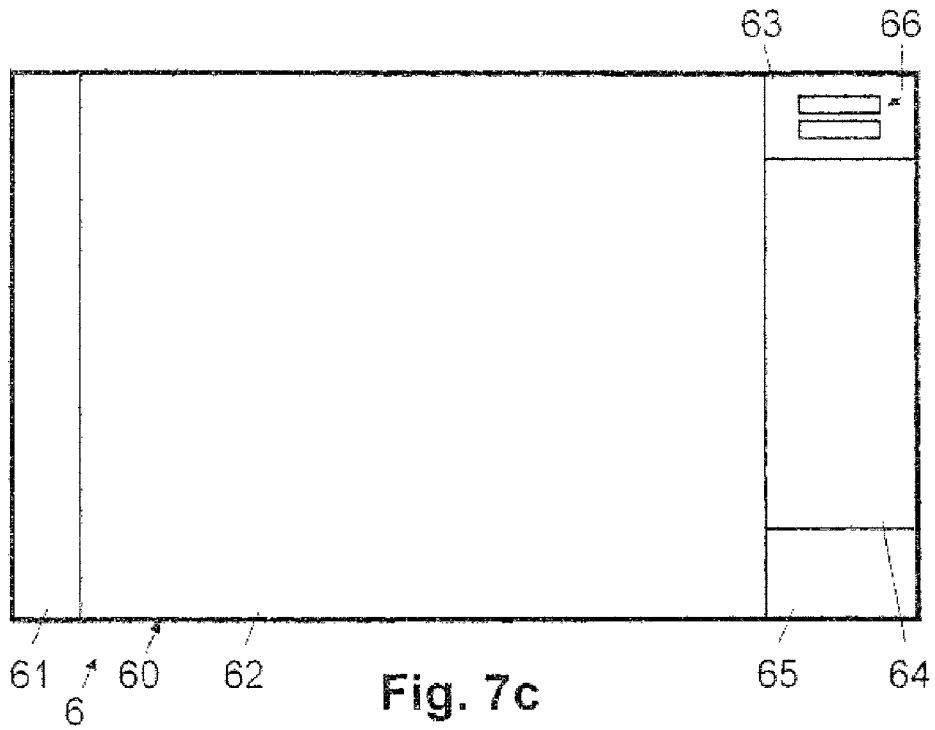
FIG. 7*c*: shows an example of the main window represented on the display, with several window areas and a represented login area.

In step S7, the login plug-in represents its login area on the display 4 in the sub-area 63' of the main window 60 to which it is linked. As shown in FIG. 7*c*, on the display 4, in addition to the window areas 61, 62, 64, 65, the login area 63 with corresponding login input fields 66 is now also visibly represented in the main window 60 of the user interface 6.

In step S8, the login plug-in receives login data from the user via the login input fields 66, for example, a user name and a password or access code.

In step S9, the widget manager plug-in, in accordance with the login of the (authorized) user, loads the stored user-specific widget configurations 36.

In step S10, the widget manager plug-in links the widget configurations 36 of the user to the previously imported widget contexts, which are associated with the window area plug-ins. Here, the views defined by the user-specific widget configurations 36 are linked to the widget contexts of the window areas.

Figure 7D:
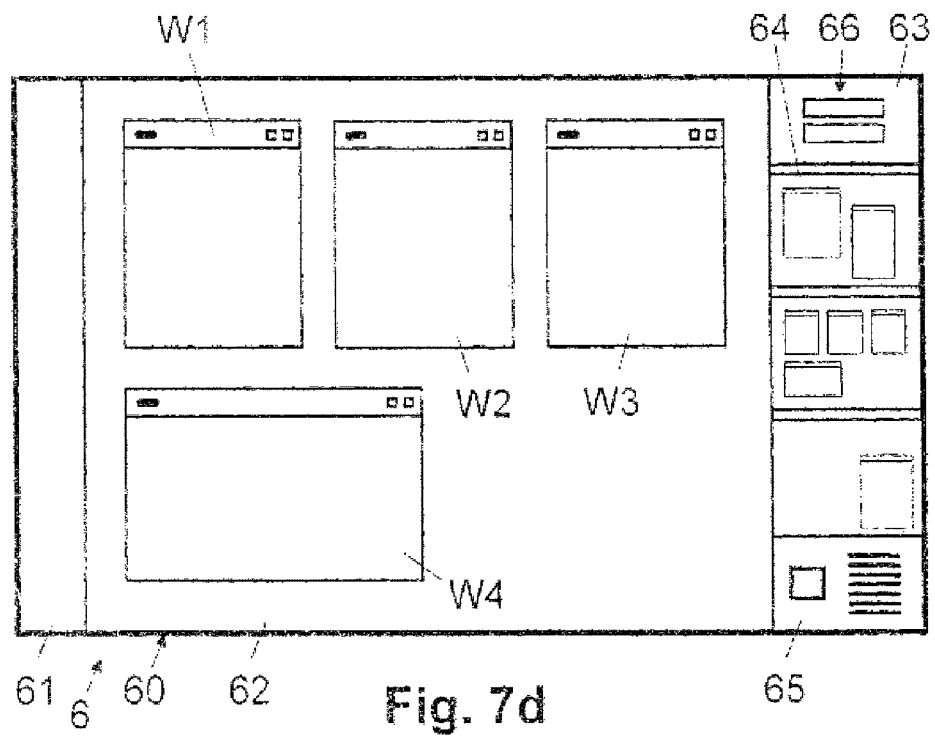
FIG. 7*d*: shows an example of the main window represented on the display, with a represented login area as well as several window areas and widgets represented therein.

In step S11, the widget plug-ins in each case generate their interface input elements and/or interface output elements and they insert themselves on the display 4 in each case in the window area to which they are linked by the certain widget contexts, and in particular in the view defined by the user-specific widget configurations 36, and in the data contents to be displayed therein. As shown in FIG. 7*d*, on the display 4 in the window areas 61, 62, 64, 65 of the main window 60 of the user interface 6, the widgets W1, W2, W3, W4 are now represented visibly in addition.

Finally, it should be indicated that the above-indicated functional modules are preferably implemented as programmed software modules, which comprise program code for controlling in each case one or more processors of a computer and are stored on a computer program product, which is connected permanently or detachably to the processors and which comprises a nonvolatile, accessible computer-readable medium. However, the person skilled in the art will understand that the functional modules can be implemented in alternative embodiment variants partially or completely by means of hardware components. In addition, it should be noted here that, although in the description computer program code has been associated with specific functional modules and the implementation of steps has been represented in a certain order, the person skilled in the art will nevertheless understand that the computer program code can be structured differently and that the order of at least certain steps can be changed, without deviating thereby from the protected subject matter.

What is claimed is:

1. A computer-implemented method for generating a graphical user interface for a program application on a display, comprising:
   registering multiple plug-ins for the program application in a plug-in catalog, wherein the plug-ins comprise a main window plug-in, multiple window area plug-ins, one or more widget plug-ins, and a widget manager plug-in;
   starting the main window plug-in and the widget manager plug-in when the program application is started, said main window plug-in representing a main window on the display and defining multiple sub-areas of the main window;
   registering the defined sub-areas of the main window in an area manager;
   starting the window area plug-ins each of which is registered in the area manager and linked by the area manager to one of the defined sub-areas of the main window, and each of which represents a window area on the display in the sub-area of the main window to which the plug-in is linked, wherein individual defined sub-areas are configured to include one or more widget plug-ins within the corresponding window area of the defined sub-area;
   determining, by said widget manager plug-in, widget contexts which are each assigned to one of the window area plug-ins, and
   starting, by said widget manager plug-in, the widget plug-ins which generate in each case interface input elements and/or interface output elements and insert them in the window area on the display to which they are linked by the determined widget contexts.

2. The method according to claim 1, wherein a login plug-in is registered in the plug-in catalog in addition, wherein when the program application is started, the login plug-in is started in addition, which receives identification data and access data from the user, wherein on the basis of the identification data and access data, user-specific stored widget configurations are determined, and wherein the user-specific widget configurations are applied to the widget contexts assigned to the window area plug-ins.

3. The method according to claim 1, wherein before plug-ins are started, in each case a plug-in-specific license check is carried out, and wherein the start of a plug-in is prevented in the case of insufficient license or absence of a license.

4. The method according to claim 1, wherein the plug-ins are filtered in a language-specific manner before they are started and wherein the start of language-specific plug-ins is geared toward a defined target language.

5. A computer system for generating a graphical user interface for a program application on a display, comprising:
   at least one processor configured to execute computer readable instructions, the computer readable instructions configure the processor to implement:
   a plug-in catalog for registering multiple plug-ins for the program application, wherein the plug-ins comprise a main window plug-in, multiple window area plug-ins, one or more widget plug-ins, and a widget manager plug-in, and
   a plug-in manager, which is arranged so as to start the main window plug-in, the plug-in manager, and the window area plug-ins when the program application is started, wherein the main window plug-in is arranged so as to represent a main window on the display and to define multiple sub-areas of the main window, and an area manager for registering the defined sub-areas of the main window,
   wherein the window area plug-ins are arranged so that they are each registered in the area manager, in order to be linked by the area manager in each case to one of the defined sub-areas of the main window, and they each represent a window area on the display in the sub-area of the main window to which they are linked, wherein individual defined sub-areas are configured to include one or more widget plug-ins within the corresponding window area of the defined sub-area,
   wherein the plug-in manager is arranged so as to determine widget contexts which are each assigned to one of the window area plug-ins, and so as to start the widget plug-ins which are in each case arranged so as to generate interface input elements and/or interface output elements and insert them in the window area on the display to which they are linked by the determined widget contexts.

6. The computer system according to claim 5, wherein, in the plug-in catalog, a login plug-in is registered in addition, wherein the plug-in manager is arranged so as to start the login plug-in in addition when the program application is started, said login plug-in being arranged so as to receive identification data and access/data from the user, wherein the widget manager plug-in is arranged so as to determine, on the basis of the identification data and access data, user-specific stored widget configurations, and to apply the user-specific widget configurations to the widget contexts assigned to the window area plug-ins.

7. The computer system according to claim 5, further comprising a license manager which is arranged so as to carry out in each case, before plug-ins are started, a plug-in-specific license check, in order to prevent the start of a plug-in in the case of insufficient license or absence of a license.

8. The computer system according to claim 5, wherein the plug-in catalog is arranged so as to filter the plug-ins in a language-specific manner before they are started, in order to gear the start of language-specific plug-ins toward a defined target language.

9. A computer program product comprising a non-transitory computer-readable medium with computer program code stored thereon for controlling one or more processors of a computer system for generating a graphical user interface for a program application on a display so that the computer system carries out the following steps:
   registering multiple plug-ins for the program application in a plug-in catalog, wherein the plug-ins comprise a main window plug-in, multiple window area plug-ins, one or more widget plug-ins, and a widget manager plug-in,
   starting the main window plug-in and the widget manager plug-in when the program application is started, said main window plug-in representing a main window on the display and defining multiple sub-areas of the main window, registering the defined sub-areas of the main window in an area manager, starting the window area plug-ins each of which is registered in the area manager and linked by the area manager to one of the defined sub-areas of the main window, and each of which represents a window area on the display in the sub-area of the main window to which the plug-in is linked, wherein individual defined sub-areas are configured to include one or more widget plug-ins within the corresponding window area of the defined sub-area, determining, by said widget manager plug-in, widget contexts which are each assigned to one of the window area plug-ins, and starting, by said widget manager plug-in, the widget plug-ins which generate in each case interface input elements and/or interface output elements and insert them in the window area on the display to which they are linked by the determined widget contexts.

10. The computer program product according to claim 9, wherein the computer program code for controlling the processors so that the computer system, in addition, registers a login plug-in in the plug-in catalog, and, when the program application is started, it starts the login plug-in in addition, which receives identification data and access data from the user, determines user-specific stored widget configurations on the basis of the identification data and access data, and applies the user-specific widget configurations to the widget contexts assigned to the window area plug-ins.

11. The computer program product according to claim 9, wherein the computer program code for controlling the processors so that the computer system, before plug-ins are started, in each case carries out a plug-in-specific license check, and prevents the start of a plug-in in the case of insufficient license or absence of a license.

12. The computer program product according to claim 9, wherein the computer program code for controlling the processors so that the computer system filters the plug-ins in a language-specific manner before they are started, and gears the start of language-specific plug-ins toward a defined target language.

* * * * *